(12) United States Patent
Kuo et al.

(10) Patent No.: US 9,967,929 B1
(45) Date of Patent: May 8, 2018

(54) HIGH PERFORMANCE LINEAR LED DRIVING CIRCUIT

(71) Applicant: ANWELL SEMICONDUCTOR CORP., Hsin-Chu (TW)

(72) Inventors: Chun-Chieh Kuo, Hsin-Chu (TW); Shih-Ping Tu, Hsin-Chu (TW); Bo-En Yan, Hsin-Chu (TW); Cheng-Po Hsiao, Hsin-Chu (TW); Chung-Hsin Huang, Hsin-Chu (TW)

(73) Assignee: Anwell Semiconductor Corp., Hsin-Chu (TW)

( * ) Notice: Subject to any disclaimer, the term of this patent is extended or adjusted under 35 U.S.C. 154(b) by 0 days. days.

(21) Appl. No.: 15/412,435

(22) Filed: Jan. 23, 2017

(51) Int. Cl.
H05B 37/00 (2006.01)
H05B 37/02 (2006.01)
H05B 33/08 (2006.01)

(52) U.S. Cl.
CPC ..... H05B 33/0812 (2013.01); H05B 33/0851 (2013.01)

(58) Field of Classification Search
CPC .............. H05B 33/0812; H05B 33/0851
USPC .......................................... 315/201
See application file for complete search history.

(56) References Cited

U.S. PATENT DOCUMENTS

| | | | | |
|---|---|---|---|---|
| 7,830,097 | B2 * | 11/2010 | Kunimatsu | H05B 33/0809 315/209 R |
| 2014/0300274 | A1 * | 10/2014 | Acatrinei | H05B 33/0815 315/85 |
| 2015/0312987 | A1 * | 10/2015 | Gibbs | H05B 33/0887 315/122 |

* cited by examiner

Primary Examiner — Daniel D Chang
(74) Attorney, Agent, or Firm — Rosenberg, Klein & Lee

(57) ABSTRACT

A high performance linear driving circuit converting an AC voltage of an external power supply into a DC output current and then outputs the DC current to at least one LED includes a detection unit, a control unit and a current unit. In a 180-degree phase sine wave period of the AC voltage, the total current of the output current is formed by a first working section, an energy saving section and a second working section, and the detection unit detects at least a voltage value of the AC voltage or a current value of the output current to generate a detection signal, and drives the control unit to modulate the duty cycle and current value of the first working section, energy saving section and second working section, and the amounts of current of the first and second working sections are greater than that of the energy saving section.

11 Claims, 7 Drawing Sheets

HIGH PERFORMANCE LINEAR LED DRIVING CIRCUIT

FIELD OF THE INVENTION

The present invention generally relates to the field of a light emitting diode (LED) power circuit, particularly to a high performance linear LED driving circuit capable of maintaining a constant total current output through a double-cycle section output current to achieve the effect of high circuit efficiency.

BACKGROUND OF THE INVENTION

1. Description of the Related Art

After Light Emitting Diode (LED) with the features of low power consumption and high performance hits the lighting market, related manufacturers spare no effort on the subject of controlling the illumination brightness, work efficiency, and service life of LED lamps. Most conventional LED lamps adopt a control circuit with a constant current architecture and connect an LED to an N-Type Metal Oxide Semiconductor Field Effect Transistor (N-MOSFET) and a current resistor in series with, and the current resistor limits the output current passing through the LED. The current resistor receives the output current and forms a voltage drop value to be fed back to an operational amplifier at both terminals of the current resistor. After the operational amplifier uses a reference voltage value to compare the voltage drop value, and a negative feedback circuit formed by connecting the operational amplifier, the N-MOSFET and the current resistor, such that the voltage drop values at both terminals of the current resistor are constant and equal to the referenlce voltage value to keep the output current constant, so as to limit the Total Harmonic Distortion (THD) within a range to facilitate the product to be sold in markets at different places. However, the total output current in a 180-degree phase sine wave period of an AC voltage of an external power supply is non-constant and varies with an increase of the voltage value of the AC voltage, and thus the component specification requirement of the LED becomes higher.

In addition, the mains power of different countries in the world are different, or even the mains power are the same, persons having ordinary skill in the art should know that the voltage value of the AC voltage is not stable and varies with time period. As a result, the output current or voltage will vary and affect the efficiency and THD value of the whole circuit. The greater the total output power, the less controllable the THD value. As a result, the THD value cannot be maintained stably within the specification, and the product quality will be unstable and unable to launch into some markets. The economic value of the industry will be reduced.

With reference to FIG. 1 for a conventional multi-sectional driving circuit 1, the multi-sectional driving circuit 1 comprises a detection part 10, a comparison part 11, a regulation part 12 and a current resistor 13, and the serially connected LEDs are divided into a plurality of small strings, and the detection part 10 is provided for detecting the voltages at the nodes between the strings to produce a detected value, and the current resistor 13 receives the current passing through the LED and forms an operating voltage value at both terminals of the current resistor 13. The comparison part 11 comprises a positive input terminal for receiving a reference value (Vref). When the detected value is received, the reference value is compared with the operating voltage value to drive the regulation part 12 to control the flowing range of the output current and then drive the strings to emit light to form an output current waveform as shown in FIG. 2. In a 180-degree phase sine wave period of the AC voltage, the output current is electrically conducted in a plurality of cycle sections, and the current value of each cycle section varies with the sinusoidal change of the AC voltage, so as to improve the power utilization. However, such method incurs complicated circuit architecture and high cost, and it still cannot overcome the problem that the total current of the output current varies with the sinusoidal change of the AC voltage. As a result, the lamps required LED components of high specification.

In view of the aforementioned problems, it is an important subject of the present invention to improve the operation of the driving circuit and output a constant total amount of current by affecting the conduction cycle of the output current to output a constant total amount of current, so that the whole circuit conversion efficiency is constant and the utilization of components is improved.

2. Summary of the Invention

Therefore, it is a primary objective of the present invention to overcome the drawbacks of the prior art by providing a high performance linear LED driving circuit, such that when the mains power varies, the duty cycle of a two-stage conducted output current is modulated to achieve the effects of a stable total output current and a high efficiency.

To achieve the aforementioned objective, the present invention discloses a high performance linear LED driving circuit for converting an AC voltage of an external power supply into an output current of a direct current (DC) and outputting the DC current to at least one LED and having a detection unit, a control unit and a current unit, and the detection unit being electrically coupled to the control unit and the LED, and the current unit being electrically coupled to the control unit and the LED, characterized in that the total current of the output current in a 180-degree phase sine wave period of the AC voltage is comprised of a first working section, an energy saving section and a second working section, and the detection unit is provided for detecting at least one selected from a voltage value of the AC voltage and a current value of the output current to form a detection signal, so as to drive the control unit to modulate the duty cycle and the current value of the first working section, the energy saving section and the second working section, and the amount of current of the first working section and the amount of current of the second working section are greater than the amount of current of the energy saving section.

Wherein, the control unit modulates the cycle time and current value of the first working section and the second working section according to the detection signal, so that the ratio of the total input power Pin of the external power supply to the total output power $P_{out}$ of the high performance linear LED driving circuit is a constant C, and Eff=$P_{out}$/$P_{in}$=C, so as to achieve the effect of a constant efficiency. The total current of the energy saving section is less than 20% of the sum of the total current of the first working section and the total current of the second working section.

In addition, the control unit comprises a controller, a reference voltage regulator, a control comparator and a switch, and the controller is electrically coupled to the detection unit, the reference voltage regulator and the switch, and the control comparator is electrically coupled to the reference voltage regulator, the switch and the current unit, and the switch is electrically coupled to the current unit. In an implementation mode, the detection unit comprises a detection resistor and a detection comparator, and an output terminal of the detection comparator is electrically coupled to the controller, and the detection resistor is electrically coupled to an input terminal of the detection comparator and a negative electrode of the LED, and a voltage value of the negative electrode of the LED is detected to produce a detected voltage value, and the detection comparator uses a reference voltage to compare with the detected value to form the detection signal provided for the controller to change a status of the switch according to the voltage value of the detection signal and affect the control comparator to module the duty cycle of the current unit and the magnitude of the output current passing through the LED, so as to achieve the effect of a constant current.

In another implementation mode, the detection unit comprises a detection resistor and a detection comparator, and the detection resistor is connected to a negative electrode of the LED and the current unit is series, and an input terminal of the detection comparator is coupled both terminals of the detection resistor and an output terminal of the detection comparator is electrically coupled to the controller, and the detection resistor receives the output current passing through the LED to form a voltage drop which is provided for the detection comparator to drive the controller to change a status of the switch and affect the control comparator to modulate the duty cycle of the current unit and the magnitude of the output current of the LED, so as to achieve the effect of a constant current.

The detection unit comprises a detection resistor and a detection comparator, and an output terminal of the detection comparator is electrically coupled to the controller, and the detection resistor is electrically coupled to an input terminal of the detection comparator and a positive electrode of the LED, and the AC voltage is detected and rectified to form a detected voltage value, and the detection comparator uses a reference voltage to compare and form the detection signal which is provided for the controller to change a status of the switch according to a conduction time of the detection signal and affect the control comparator to modulate the duty cycle of the current unit and the magnitude of an output current passing through the LED, so as to achieve the effect of a constant current.

In addition, the detection unit comprises a Zener diode and at least one current reduction resistor, and the control unit comprises a control comparator, and an output terminal of the control comparator is coupled to the current unit, and a negative electrode of the Zener diode is electrically coupled to a positive electrode of the LED, and the positive electrode is electrically coupled to the current reduction resistor and the control comparator, and the current reduction resistor detects the rectified AC voltage to form the detection signal which is provided for the control comparator to use a reference voltage for comparison and then change the duty cycle of the current unit.

The LED comprises a capacitor of a large capacitance value connected in parallel to the LED to improve the current constancy of the output current to prevent a strobe of the LED.

In summation, the present invention breaks through the traditional thought and outputs a current with double wave sections in a 180-degree phase sine wave period of the AC voltage, and the duty cycle and current value of the first working section and the second working section vary with a change of the AC voltage, so that the total amount of current of the output current is maintained constant to achieve the effect of a constant output power, so as to improve the power conversion efficiency of the whole circuit and meets the industrial requirements. Therefore, the present invention may be used for 110V LED lamps with 80V or 90V LEDs without requiring the use of the 130V LEDs, and thus greatly lowering the requirement of the driving voltage of the LED, improving the utilization of the LED, and reducing the cost of the lamp.

DESCRIPTION OF THE PREFERRED EMBODIMENTS

The above and other objects, features and advantages of this disclosure will become apparent from the following detailed description taken with the accompanying drawings.

Figure 1:
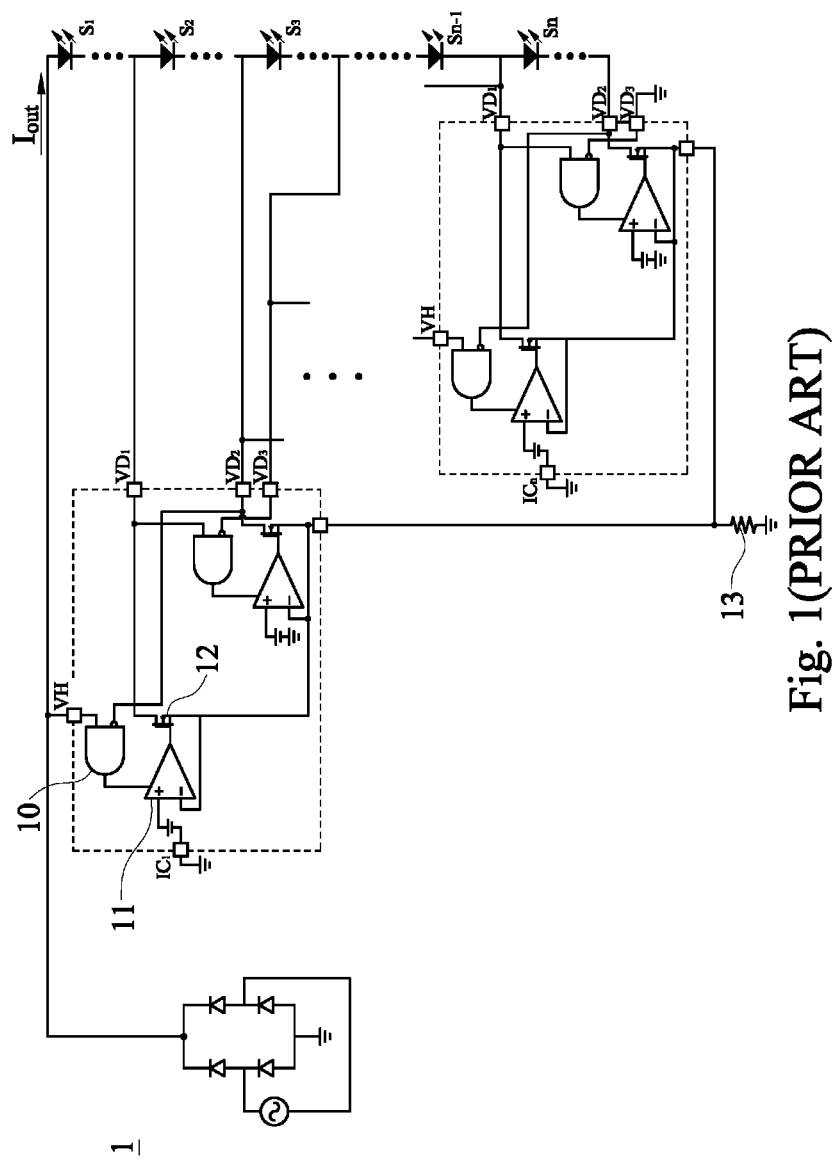
FIG. 1 is a circuit diagram of a conventional multi-sectional driving circuit.
Figure 2:
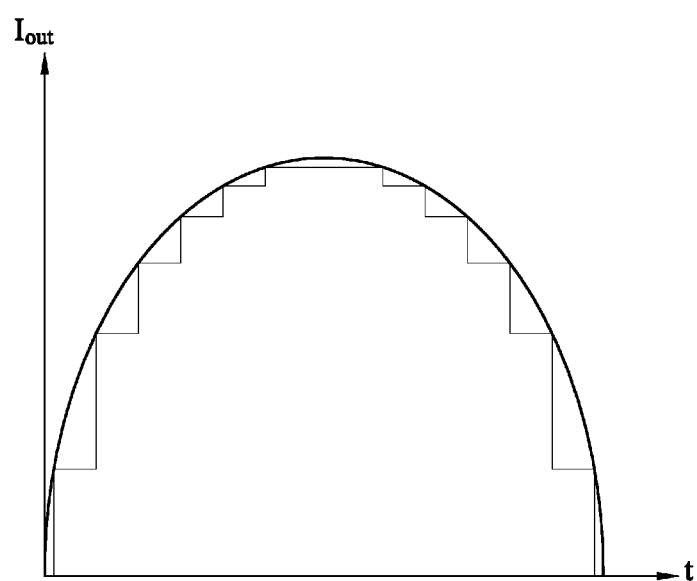
FIG. 2 is a waveform chart of a conventional multi-sectional driving circuit.
Figure 3:
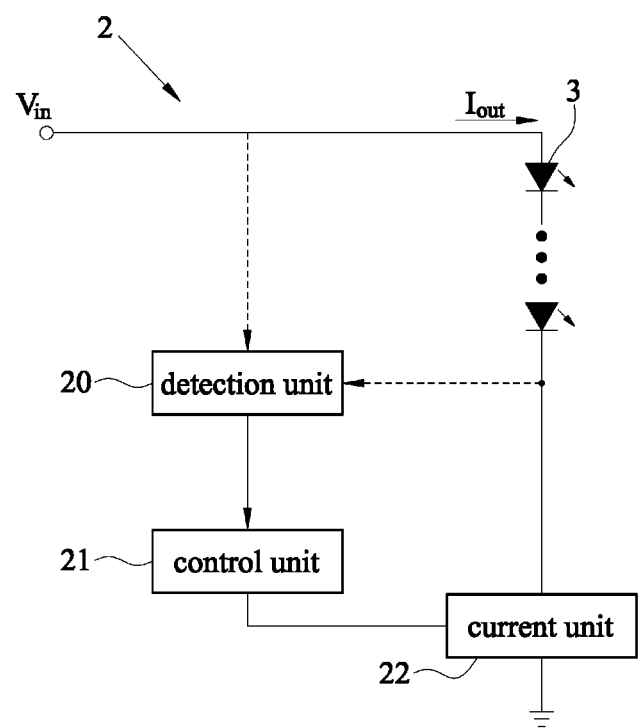
FIG. 3 is a block diagram of a preferred embodiment of the present invention.
Figure 4:
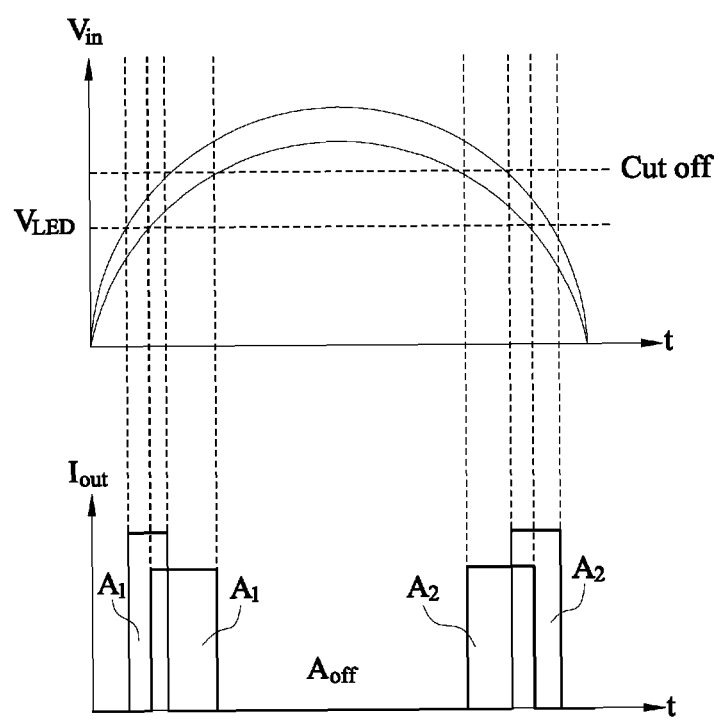
FIG. 4 is a waveform chart of a preferred embodiment of the present invention.

With reference to FIGS. 3 and 4 for a block diagram and a waveform chart of a high performance linear LED driving circuit 2 in accordance with a preferred embodiment of the present invention respectively, the high performance linear LED driving circuit 2 is provided for converting AC voltage ($V_{in}$) of an external power supply into an output current ($L_{out}$) of a direct current (DC) and outputting the DC current to at least one LED 3 and comprises a detection unit 20, a control unit 21 and a current unit 22, and the detection unit 20 is electrically coupled to the control unit 21 and the LED 3, and the current unit 22 is electrically coupled to the control unit 21 and the LED 3. In a 180-degree phase sine wave period of the AC voltage, the total current of the output current is formed by a first working section ($A_1$), an energy saving section ($A_{off}$) and a second working section ($A_2$), and the detection unit 20 is provided for detecting at least one of a voltage value of the AC voltage and a current value of the output current to generate a detection signal to drive the control unit 21 to modulate the duty cycle and current value of the first working section, the energy saving section and the second working section, so that the total current of the output current is maintained constant without varying with a sinusoidal change of the AC voltage. In other words, the ratio of the total input power $P_{in}$ of the external power supply to the total output power $P_{out}$ of the high performance linear LED driving circuit 2 is a constant C, which is Eff=$P_{out}/P_{in}$=C, so as to achieve the effect of a constant efficiency. In addition, the amount of current of the first working section and the amount of current of the second working section are greater than the amount of current of the energy saving section, and the total current of the first working section and the total current of the second working section may be equal or not equal. The total current of the energy saving section is less than 20% or even less than 10% of the sum of the total current of the first working section and the total current of the second working section. Of course, the current value of the energy saving section drops vertically down, drops linearly, drops curvedly, or drops to a level of zero current value.

Figure 5:
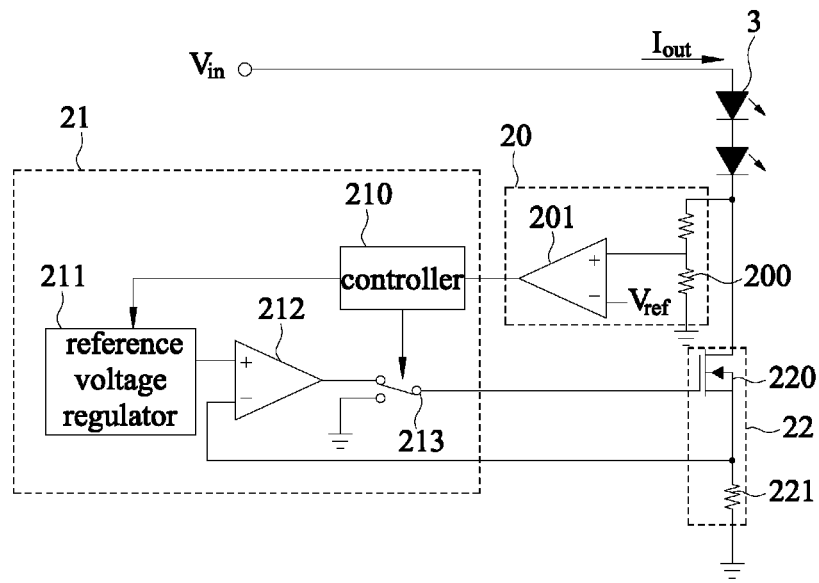
FIG. 5 is a circuit diagram of a first implementation mode of a preferred embodiment of the present invention.

In an implementation mode as shown in FIG. 5, the detection unit 20 comprises a detection resistor 200 and a detection comparator 201, and the control unit 21 comprises a controller 210, a reference voltage regulator 211, a control comparator 212 and a switch 213, and the current unit 22 is formed by a MOSFET 220 and a current resistor 221. The detection resistor 200 is electrically coupled to a negative electrode of the LED 3, the MOSFET 220, and a positive input terminal of the detection comparator 201, and a negative input terminal of the detection comparator 201 comprises a reference voltage such as 20V, and an output terminal of the detection comparator 201 is electrically coupled to an input terminal of the controller 210. An output terminal of the controller 210 is electrically coupled to the reference voltage regulator 211 and the switch 213, and a positive input terminal of the control comparator 212 is coupled to the reference voltage regulator 211, and the negative input terminal is coupled to the MOSFET 220 and the current resistor 221, and its output terminal is electrically coupled to the switch 213, and the switch 213 is electrically coupled to a gate of the MOSFET 220, and the MOSFET 220 is connected to the LED 3 and the current resistor 221 in series, and the detection resistor 200 is provided for detecting a voltage value of a negative electrode of the LED 3 to form a detected voltage value, which is provided for the detection comparator 201 to use the reference voltage for comparison to form the detection signal, and the controller 210 changes a status of the switch 213 according to the voltage value of the detection signal to affect the control comparator 212 to modulate the operating time of the duty cycle of the MOSFET 220 and the magnitude of the output current passing through the LED 3, and the mechanism $T_{on}*I_{out-peak}=C$ is provided to achieve the effect of a constant current and improve the conversion efficiency of the whole circuit, wherein $T_{on}$ is the time for the output current to pass through the LED 3, and $I_{out-peak}$ is the voltage value of the output current received by the current resistor 221.

Figure 6:
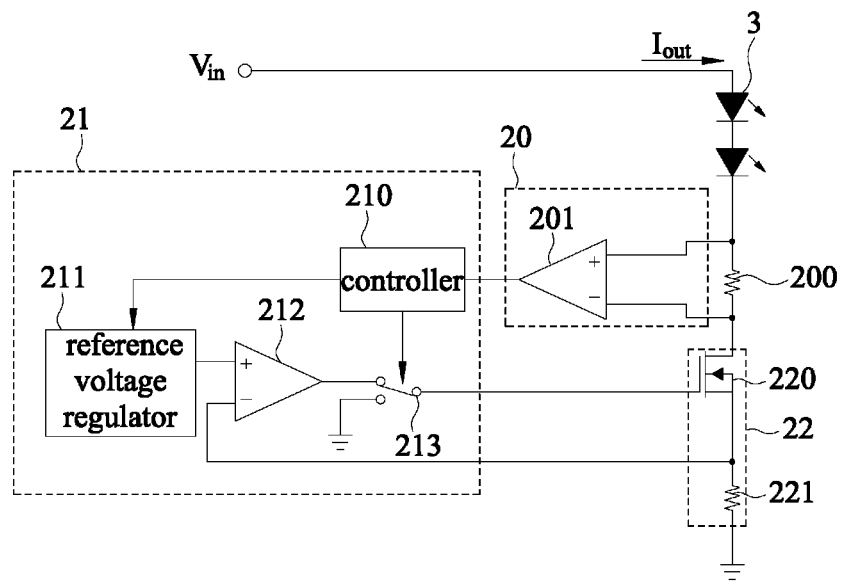
FIG. 6 is a circuit diagram of a second implementation mode of a preferred embodiment of the present invention.

In the second implementation mode as shown in FIG. 6, the detection resistor 200 may be connected to a negative electrode of the LED 3 and the MOSFET 220 in series, and positive and negative input terminals of the detection comparator 201 are coupled to both terminals of the detection resistor 201 respectively, and the detection resistor 200 receives the output current passing through the LED 3 to form a voltage drop, and the detection comparator 201 uses the voltage drop to drive the controller 210 to change a status of the switch 213 to affect the control comparator 212 to modulate the operating time of the duty cycle of the MOSFET 220 and the magnitude of the output current passing through the LED 3.

Figure 7:
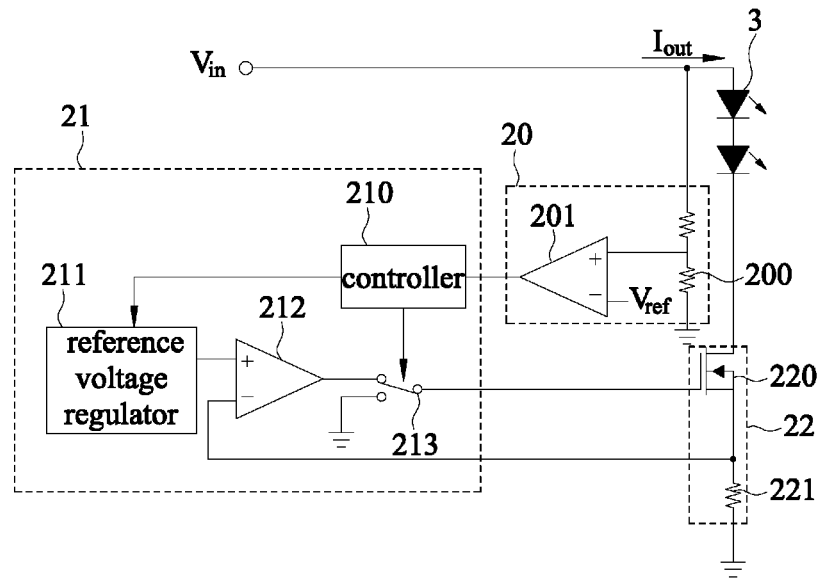
FIG. 7 is a circuit diagram of a third implementation mode of a preferred embodiment of the present invention.

In the third implementation mode as shown in FIG. 7, the detection unit 20 may have the detection resistor 200 and the detection comparator 201, but the detection resistor 200 is electrically coupled to a positive input terminal of the detection comparator 201 and coupled to a positive electrode of the LED 3 for directly detecting the rectified AC voltage to produce the detected voltage value, and the detection comparator 201 uses the reference voltage for comparison to generate the detection signal which is provided for the controller 210 to change a status of the switch 213 according to a change of the conduction time of the detection signal to affect the control comparator 212 to modulate the operating time of the duty cycle of the MOSFET 220 and the magnitude of the output current passing through the LED 3, so as to achieve the effect of a constant current. It is noteworthy that the controller may drive the reference voltage regulator 211 to module the reference voltage provided to the control comparator 212 according to a voltage value of the detection signal or according to the conduction time of the detection signal, so as to affect and modulate the operating time of the duty cycle of the MOSFET and the magnitude of the output current passing through the LED 3.

Figure 8:
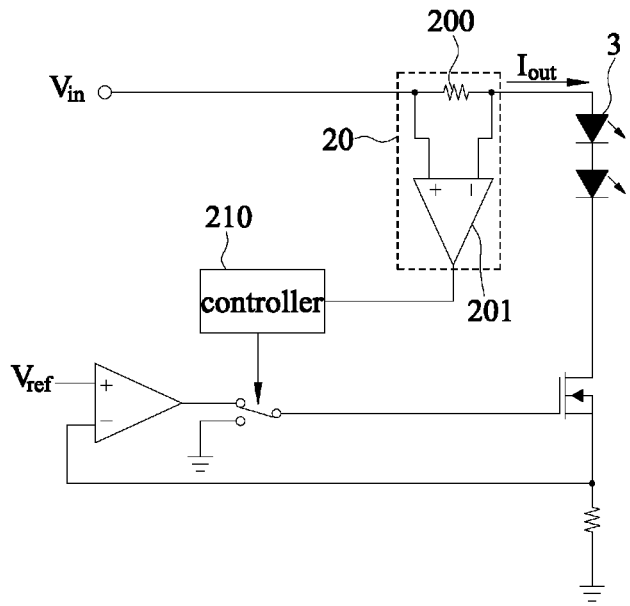
FIG. 8 is a circuit diagram of a fourth implementation mode of a preferred embodiment of the present invention.

In the fourth implementation mode as shown in FIG. 8, the detection unit 20 has the detection resistor 200 and the detection comparator 201, and the control unit 21 has the controller 210, the control comparator 212 and the switch 213. Before the detection resistor 200 is connected to the positive electrode of the LED 3, the input current not passing through the LED 3 is received to form the voltage drop at both terminals. The positive and negative input terminals of the detection comparator 201 are coupled to both terminals of the detection resistor 200 respectively, and its output terminal is electrically coupled to an input terminal of the controller 210. The output terminal of the controller 210 is electrically coupled to the switch 213, and the positive input terminal of the control comparator 212 has the reference voltage, and the negative input terminal is coupled to the MOSFET 220 and the current resistor 221 and its output terminal is electrically coupled to the switch 213, and the switch 213 is electrically coupled to a gate of the MOSFET 220. The detection comparator 201 determines the voltage drop to generate the detection signal, so that the controller 210 changes a status of the switch 213 to affect the control comparator 212 to modulate the operating time of the duty cycle of the MOSFET 220 according to the conduction time of the detection signal. In other words, the difference between the fourth implementation mode and the aforementioned the first to third implementation modes resides on that the circuit of the fourth implementation mode does not have the reference voltage regulator 211. Although it can achieve the effect of a high efficiency, it cannot achieve the effect of a constant current. All these four implementation modes adopt the reference voltage regulator 211 to achieve both effects of high efficiency and constant current, or do not adopt the reference voltage regulator 211 to achieve the effect of a high efficiency only.

Figure 9:
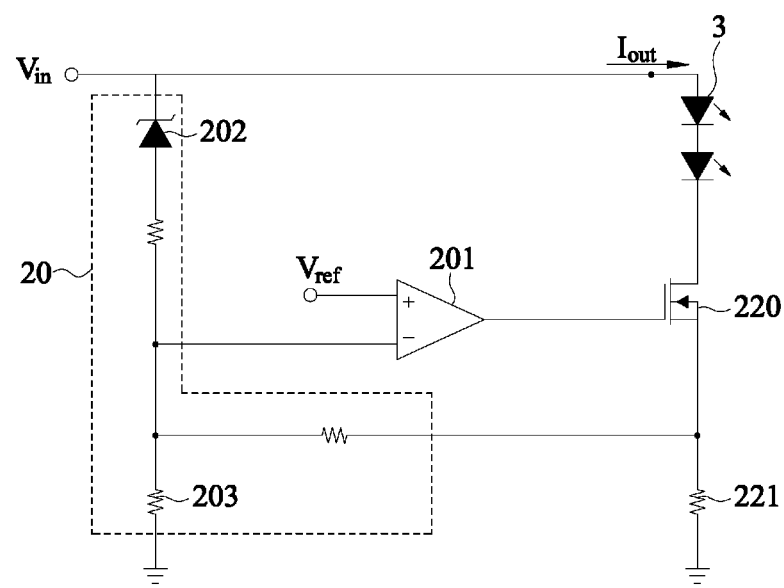
FIG. 9 is a circuit diagram of a fifth implementation mode of a preferred embodiment of the present invention.

Although the efficiency achieved by the constant current of each of the implementation modes achieves a very good result, yet the present invention may also be accomplished by the implementation mode as shown in FIG. 9. The detection unit 20 comprises a Zener diode 202 and at least one current reduction resistor 203, and the control unit 212 has the control comparator 212, and an output terminal of the control comparator 212 is coupled to a gate of the MOSFET 220, and a negative electrode of the Zener diode 202 is electrically coupled to a positive electrode of the LED 3 and its positive electrode is electrically coupled to the current reduction resistor 202 and a negative input terminal of the control comparator 212. The current reduction resistor 200 detects the rectified AC voltage to generate the detection signal. If the voltage value of the rectified AC voltage exceeds the voltage value set by the Zener diode 202, the current reduction resistor 203 will destroy the original built negative feedback current mechanism. In the other words, the control comparator 212 compares the reference voltage and the detection signal, and then turns off the MOSFET 220. Until the voltage value of the rectified AC voltage is smaller than the voltage value set by the Zener diode 202, operation of the MOSFET 220 is resumed.

The present invention detects at least one of the inputted AC voltage and the outputted current. If the input voltage value of the AC voltage rises to a certain level such as the reference voltage, the output current is dropped or turned off. When the AC voltage is dropped to a certain level, and the output mechanism will be resumed, and the efficiency will be improved. In the detection of voltage, the input voltage value of the AC voltage or the voltage value of the LED 3 is set to constant. In the calculation of time, the time for the operation and mechanism of turning off or reducing the output current in each duty cycle is calculated. In addition, the current unit 22 primarily achieves the effect of a constant output current, so that the circuit architecture and components of the aforementioned implementation modes may adopt a current mirror as the basic architecture or the MOSFET 220 is a Bipolar Junction Transistor (BJT), etc.

What is claimed is:

1. A high performance linear LED driving circuit, for converting an AC voltage of an external power supply into an output current of a direct current (DC) and outputting the DC current to at least one LED, comprising a detection unit, a control unit and a current unit, and the detection unit being electrically coupled to the control unit and the LED, and the current unit being electrically coupled to the control unit and the LED, characterized in that a total current of the output current in a 180-degree phase sine wave period of the AC voltage is comprised of a first working section, an energy saving section and a second working section, and the detection unit is provided for detecting a voltage value of the AC voltage or a current value of the output current to form a detection signal, so as to drive the control unit to modulate a duty cycle and a current value of the first working section, the energy saving section and the second working section, and a current of the first working section and a current of the second working section are greater than a current of the energy saving section, wherein the control unit modulates a cycle time and the current value of the first working section and the second working section according to the detection signal, so that a ratio of a total input power $P_{in}$ of the external power supply to a total output power $P_{out}$ of the high performance linear LED driving circuit is a constant C, and $Eff=P_{out}/P_{in}=C$, so as to achieve the effect of a constant efficiency, wherein a total current of the energy saving section is less than 20% of a sum of a total current of the first working section and a total current of the second working section, wherein the control unit comprises a controller, a reference voltage regulator, a control comparator and a switch, and the controller is electrically coupled to the detection unit, the reference voltage regulator and the switch, and the control comparator is electrically coupled to the reference voltage regulator, the switch and the current unit, and the switch is electrically coupled to the current unit.

2. The high performance linear LED driving circuit of claim 1, wherein the detection unit comprises a detection resistor and a detection comparator, and an output terminal of the detection comparator is electrically coupled to the controller, and the detection resistor is electrically coupled to an input terminal of the detection comparator and a negative electrode of the LED, and the detection resistor detects a voltage value of the negative electrode of the LED to produce a detected voltage value, and the detection comparator uses a reference voltage to compare with the detected value to form the detection signal provided for the controller to change a status of the switch according to a voltage value of the detection signal and affect the control comparator to modulate a duty cycle of the current unit and a magnitude of the output current passing through the LED, so as to achieve the effect of a constant current.

3. The high performance linear LED driving circuit of claim 2, wherein a capacitor of a large capacitance value is connected in parallel to the LED to improve the current constancy of the output current to prevent a strobe of the LED.

4. The high performance linear LED driving circuit of claim 1, wherein the detection unit comprises a detection resistor and a detection comparator, and the detection resistor is connected in series to a negative electrode of the LED and the current unit, and an input terminal of the detection comparator is coupled to both terminals of the detection resistor and an output terminal of the detection comparator is electrically coupled to the controller, and the detection resistor receives the output current passing through the LED to form a voltage drop which is provided for the detection comparator to drive the controller to change a status of the switch and affect the control comparator to modulate a duty cycle of the current unit and a magnitude of the output current of the LED, so as to achieve the effect of a constant current.

5. The high performance linear LED driving circuit of claim 4, wherein a capacitor of a large capacitance value is connected in parallel to the LED to improve the current constancy of the output current to prevent a strobe of the LED.

6. The high performance linear LED driving circuit of claim 1, wherein the detection unit comprises a detection resistor and a detection comparator, and an output terminal of the detection comparator is electrically coupled to the controller, and the detection resistor is electrically coupled to an input terminal of the detection comparator and a positive electrode of the LED, and the AC voltage is rectified and detected to form a detected voltage value, and the detection comparator uses a reference voltage to compare and form the detection signal which is provided for the controller to change a status of the switch according to a conduction time of the detection signal and affect the control comparator to modulate a duty cycle of the current unit and a magnitude of an output current passing through the LED, so as to achieve the effect of a constant current.

7. The high performance linear LED driving circuit of claim 6, wherein a capacitor of a large capacitance value is connected in parallel to the LED to improve the current constancy of the output current to prevent a strobe of the LED.

8. A high performance linear LED driving circuit, for converting an AC voltage of an external power supply into an output current of a direct current (DC) and outputting the DC current to at least one LED, comprising a detection unit, a control unit and a current unit, and the detection unit being electrically coupled to the control unit and the LED, and the current unit being electrically coupled to the control unit and the LED, characterized in that a total current of the output current in a 180-degree phase sine wave period of the AC voltage is comprised of a first working section, an energy saving section and a second working section, and the detection unit is provided for detecting a voltage value of the AC voltage or a current value of the output current to form a detection signal, so as to drive the control unit to modulate a duty cycle and a current value of the first working section, the energy saving section and the second working section, and a current of the first working section and a current of the second working section are greater than a current of the energy saving section, wherein the control unit modulates a cycle time and the current value of the first working section and the second working section according to the detection signal, so that a ratio of a total input power Pin of the external power supply to a total output power Pout of the high performance linear LED driving circuit is a constant C, and Eff=Pout/Pin=C, so as to achieve the effect of a constant efficiency, wherein a total current of the energy saving section is less than 20% of a sum of a total current of the first working section and a total current of the second working section, wherein the detection unit comprises a detection resistor and a detection comparator, and the control unit comprises a controller, a control comparator and a switch, and the detection resistor is connected to a positive electrode of the LED in series to receive the rectified AC voltage to form a voltage drop, and an input terminal of the detection comparator is coupled to both terminals of the detection resistor, and the controller is electrically coupled to an output terminal of the detection comparator and the switch, and the control comparator is electrically coupled to the switch and the current unit, and the switch is electrically coupled to the current unit, and the detection comparator uses the voltage drop to form the detection signal which is provided for the controller to change a status of the switch according to a conduction time of the detection signal to affect the control comparator to modulate a duty cycle of the current unit.

9. The high performance linear LED driving circuit of claim 8, wherein a capacitor of a large capacitance value is connected in parallel to the LED to improve the current constancy of the output current to prevent a strobe of the LED.

10. A high performance linear LED driving circuit, for converting an AC voltage of an external power supply into an output current of a direct current (DC) and outputting the DC current to at least one LED, comprising a detection unit, a control unit and a current unit, and the detection unit being electrically coupled to the control unit and the LED, and the current unit being electrically coupled to the control unit and the LED, characterized in that a total current of the output current in a 180-degree phase sine wave period of the AC voltage is comprised of a first working section, an energy saving section and a second working section, and the detection unit is provided for detecting a voltage value of the AC voltage or a current value of the output current to form a detection signal, so as to drive the control unit to modulate a duty cycle and a current value of the first working section, the energy saving section and the second working section, and a current of the first working section and a current of the second working section are greater than a current of the energy saving section, wherein the control unit modulates a cycle time and the current value of the first working section and the second working section according to the detection signal, so that a ratio of a total input power $P_{in}$ of the external power supply to a total output power $P_{out}$ of the high performance linear LED driving circuit is a constant C, and Eff=$P_{out}$/$P_{in}$=C , so as to achieve the effect of a constant efficiency, wherein a total current of the energy saving section is less than 20% of a sum of a total current of the first working section and a total current of the second working section, wherein the detection unit comprises a Zener diode and at least one current reduction resistor, and the control unit comprises a control comparator, and an output terminal of the control comparator is coupled to the current unit, and a negative electrode of the Zener diode is electrically coupled to a positive electrode of the LED, and a positive electrode of the Zener diode is electrically coupled to the current reduction resistor and the control comparator, and the current reduction resistor detects the rectified AC voltage to form the detection signal which is provided for the control comparator to use a reference voltage for comparison and then change a duty cycle of the current unit.

11. The high performance linear LED driving circuit of claim 10, wherein a capacitor of a large capacitance value is connected in parallel to the LED to improve the current constancy of the output current to prevent a strobe of the LED.

* * * * *